United States Patent
Azartash et al.

(10) Patent No.: US 12,536,658 B1
(45) Date of Patent: Jan. 27, 2026

(54) METHOD AND SYSTEM FOR DETERMINING THE VIABILITY OF AN EMBRYO

(71) Applicant: Noor Sciences Inc., Los Altos, CA (US)

(72) Inventors: Kaveh Azartash, Aliso Viejo, CA (US); Naz Sadrzadeh, Los Altos, CA (US); Nader Sadrzadeh, Los Altos, CA (US)

(73) Assignee: Noor Sciences Inc., Los Altos, CA (US)

( * ) Notice: Subject to any disclaimer, the term of this patent is extended or adjusted under 35 U.S.C. 154(b) by 341 days.

(21) Appl. No.: 18/371,906

(22) Filed: Sep. 22, 2023

Related U.S. Application Data

(60) Provisional application No. 63/410,157, filed on Sep. 26, 2022.

(51) Int. Cl.
*G06T 7/00* (2017.01)

(52) U.S. Cl.
CPC .. *G06T 7/0012* (2013.01); *G06T 2207/10064* (2013.01); *G06T 2207/20084* (2013.01); *G06T 2207/30044* (2013.01)

(58) Field of Classification Search
None
See application file for complete search history.

(56) References Cited

U.S. PATENT DOCUMENTS

| | | | |
|---|---|---|---|
| 2018/0143001 A1* | 5/2018 | Popescu | G01B 9/04 |
| 2022/0198657 A1* | 6/2022 | Hall | G06N 3/045 |
| 2022/0328188 A1* | 10/2022 | Sanchez | G16H 10/40 |

FOREIGN PATENT DOCUMENTS

| | | | | |
|---|---|---|---|---|
| WO | WO-2022211402 A1 * | 10/2022 | | A61B 5/7264 |

* cited by examiner

*Primary Examiner* — Tsung Yin Tsai
(74) *Attorney, Agent, or Firm* — Clause Eight; Michael Catania

(57) ABSTRACT

A method and system for determining the viability of an embryo using an embryo morpho-metabolic index (EMMI) and Em-Lux device is disclosed herein. The EMMI integrates morphological and metabolic endpoints to evaluate embryos, aiding IVF facilities in selecting embryos with the highest probability of successful implantation.

19 Claims, 10 Drawing Sheets

SINGLE-POSITION EMBRYO UNIT
Based on 35 mm dish

QUAD-POSITION EMBRYO UNIT
Based on 60 mm dish

Brightfield Images

Photon Density FLIM

METHOD AND SYSTEM FOR DETERMINING THE VIABILITY OF AN EMBRYO

CROSS REFERENCE TO RELATED APPLICATION

The Present Application claims priority to U.S. Provisional Patent Application No. 63/410,157, filed on Sep. 26, 2022, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to analysis of embryos.

Description of the Related Art

The prior art discusses various method of analyzing embryos.

U.S. Patent Publication Number 20200320708 discloses a system for determining the viability of an embryo, comprising: an imaging device; an excitation device configured to direct excitation energy at an embryo; a controller communicatively connected to the imaging device and the excitation device, configured to drive the excitation device and collect images from the imaging device at an imaging frequency; a non-transitory computer-readable medium with instructions stored thereon, that when executed by a processor perform steps comprising: acquiring a set of images from the imaging device; performing a Fourier Transformation on the set of images to generate a set of phasor coordinates; computing a D-trajectory of the phasor coordinates; computing a set of values of additional parameters from the set of images and the phasor coordinates; comparing the set of values to a set of stored values related to embryos of known viability, and calculating a viability index factor of the embryo from the set of values and the set of stored values.

BRIEF SUMMARY OF THE INVENTION

The Present invention is an AI based imaging system and method to assess both functional and structural endpoints in human embryos and eggs in addition to patient demographics and medical history.

One aspect of the present invention is a method for determining the viability of an embryo. The method comprises receiving, at a processor, a plurality of morphological endpoints from a plurality of intensity images of a plurality of embryos obtained from an imaging module device. The method also includes receiving, at the processor, a plurality of metabolical and functional endpoints from fluorescence lifetime imaging microscopy (FLIM) data for the plurality of embryos based on Principal Component Analysis and multiple harmonics analysis to capture vibrations in the plurality of embryos. The method also includes receiving, at the processor, parental health data for a parent of the plurality of embryos. The method also includes calculating, at the processor, an embryo viability score for the plurality of embryos based on the parental health data, plurality of metabolical and functional endpoints from FLIM=data and the plurality of morphological endpoints. The method also includes displaying the embryo viability score at a user interface.

Yet another aspect of the present invention is a non-transitory computer-readable medium that stores a program that causes a processor to determine the viability of an embryo by executing the following steps including receiving, at a processor, a plurality of morphological endpoints from a plurality of intensity images of a plurality of embryos obtained from a device. The steps also include receiving, at the processor, a plurality of metabolical and functional endpoints from FLIM data for the plurality of embryos based on a Principal Component Analysis and multiple harmonics based FLIM analysis to capture vibrations in the plurality of embryos. The steps also include receiving, at the processor, parental health data for a parent of the plurality of embryos. The steps also include calculating, at the processor, an embryo viability score for the plurality of embryos based on the parental health data, plurality of metabolical and functional endpoints from FLIM data and the plurality of morphological endpoints. The steps also include displaying the embryo viability score at a user interface.

Yet another aspect of the present invention is a system for determining the viability of an embryo. The system comprises a device, a processor, and a user interface display. The device is connected to a microscope and controls the light source and detection mechanism for the microscope. The processor is configured to receive a plurality of morphological endpoints from a plurality of intensity images of a plurality of embryos obtained from the device. The processor is also configured to receive a plurality of metabolical and functional endpoints from FLIM data for the plurality of embryos based on a novel FLIM data analysis to capture vibrations in the plurality of embryos. The processor is also configured to received parental health data for a parent of the plurality of embryos. The processor is also configured to calculate an embryo viability score for the plurality of embryos based on the parental health data, plurality of metabolical and functional endpoints from FLIM data and the plurality of morphological endpoints. The user interface display is configured to display the embryo viability score at a user interface.

Yet another aspect of the present invention is a method for ranking the viability of a plurality of embryos. The method includes receiving, at a processor, a plurality of morphological endpoints from a plurality of intensity images of a plurality of embryos obtained from an imaging module device. The method also includes receiving, at the processor, a plurality of metabolical and functional endpoints from FLIM data for the plurality of embryos based on a Principal Component Analysis and multiple harmonics analysis FLIM analysis to capture vibrations in the plurality of embryos. The method also includes receiving, at the processor, parental health data for a parent of the plurality of embryos. The method also includes calculating, at the processor, an embryo viability score for each of the plurality of embryos based on the parental health data, plurality of metabolical and functional endpoints from FLIM data and the plurality of morphological endpoints. The method also include ranking each of the plurality of embryos based on the embryo viability score at a user interface.

Yet another aspect of the present invention is a method for determining the viability of an embryo. The method includes generating data for a plurality of embryos at an imaging module device. The method also includes separating the data into FLIM data and intensity images. The method also includes decoding lifetime files on good and fair lifetime images. The method also includes assigning individual photons to each pixel. The method also includes identifying clusters in a phasor plot and calculating probabilities of each pixel belong to each cluster. The method also includes delineating clusters based on the probability values. The method also includes measuring concentration of free/bound NADH, FAD, Lipids, tryptophan, leucine and asparagine. The method also includes applying gradient boosted tree classification methods to the data. The method also includes calculating, at the processor, an embryo viability score for each of the plurality of embryos based on the parental health data, plurality of metabolical and functional endpoints from FLIM data and the plurality of morphological endpoints. The method also includes ranking each of the plurality of embryos based on the embryo viability score at a user interface.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

One embodiment is an imaging module comprising an optical device for fluorescence lifetime imaging in embryos, connected to a commercial microscope in order to assess morphological (shape and size) and functional/metabolical (NADH, Lipids, FAD, etc.) characteristics of human embryos and eggs.

Figure 1:
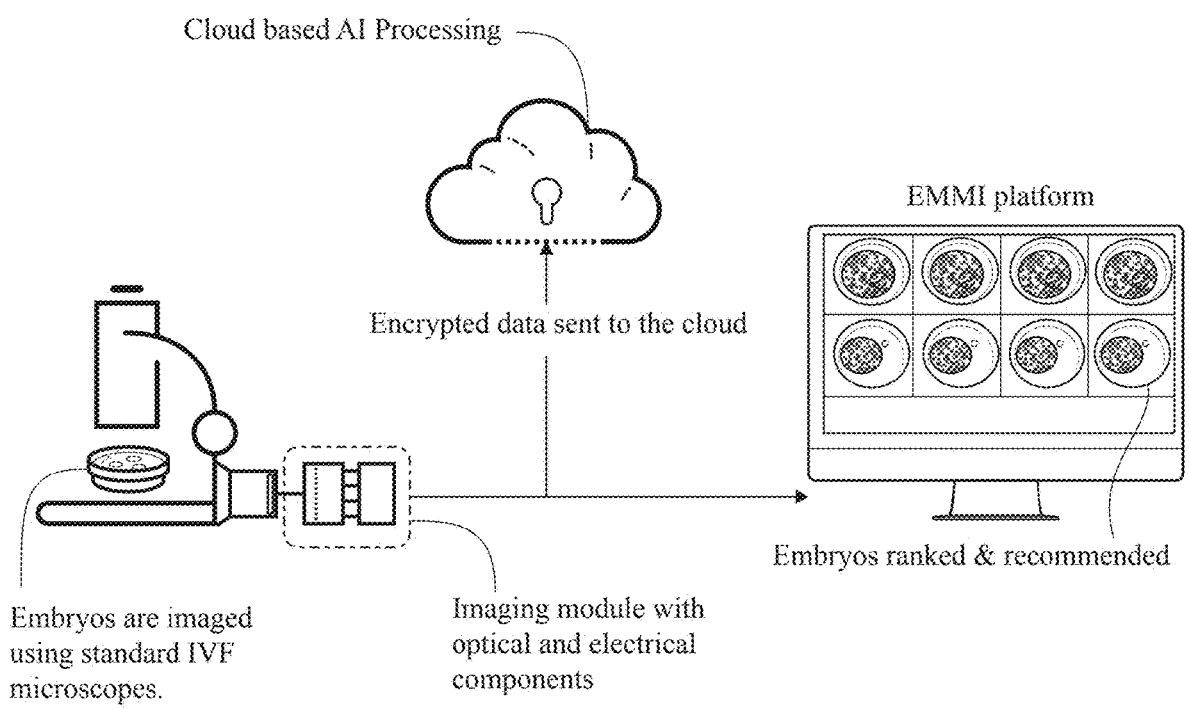
FIG. 1 is a block diagram of a system for determining the viability of an embryo.

The device, referenced herein as Em-Lux, is connected to a microscope(s) and takes over the light source and the detection system. Em-Lux captures both intensity images and Fl.Lifetime (functional endpoints for NADH, FAD, Lipids, etc.). Em-Lux can also function as a stand-alone device that contains all optical components necessary to function without a commercial microscope. As shown in FIG. 1, all the data (intensity images and FLIM Lifetime data) are then transferred to a cloud-based infrastructure through an internet connection in Em-Lux for AI Processing. The output will be a simple UI that ranks Embryos based on their viability and recommends which embryo(s) to be implanted for IVF procedure.

Em-Lux is an advanced optical imaging device meticulously crafted to facilitate high-resolution fluorescence lifetime imaging in embryonic specimens. It can be employed as a standalone imaging module or seamlessly integrated with existing commercial IVF (In Vitro Fertilization) microscopes such as the IX730. The primary objective of Em-Lux is to enable researchers and clinicians to acquire critical data about the fluorescence lifetime characteristics of NADH and FAD, essential molecules in cellular metabolism, within embryonic tissues. This breakthrough technology has been condensed into a compact and user-friendly showbox-sized device, offering versatility and precision in embryonic imaging applications. In addition to obtaining FLIM data, Em-Lux enables capturing brightfield images through optical components that are detailed in the design.

Key Components

Em-Lux's light source is capable of exciting NADH and FAD molecules at either 740 nm or 780 nm wavelengths pulsed laser or similar wavelengths diode laser, or 355 nm near UV pulsed. This precise excitation ensures accurate data collection and minimized potential damage to the delicate embryonic samples.

A specialized Fluorescence Lifetime Imaging (FLIM) card is at the core of Em-Lux, enabling the accurate measurement of fluorescence lifetimes within the sample.

The Photomultiplier Tube (PMT) serves as the sensitive detector capturing emitted fluorescence signals with remarkable sensitivity and speed. This component is critical for precise lifetime measurements.

Em-Lux is equipped with a high-resolution CMOS camera, serving multiple purposes, such as locating samples, capturing contrast images, and scanning QR codes on petri dishes for sample identification.

The device offers flexibility with multiple microscope objectives (10×, 20×, or 40×air) to accommodate various magnification requirements, enabling detailed imaging of embryonic structures.

The XYZ stage, precisely controlled by a computer interface allows for precise positioning and movement of the sample, facilitating targeted imaging and data acquisition.

Em-Lux incorporates a vertical post that securely holds the stage and samples in place. Surrounding the stage is a compact water-powered incubator, maintaining a controlled temperature environment for embryonic viability during imaging.

Em-Lux features a sophisticated mechanical extension system, reminiscent of old CD players, which extends out to securely hold the sample during imaging. It ensures that imaging is conducted in a controlled and dark environment, minimizing external interferences.

The optical path of the Em-Lux includes a series of high-quality lenses, specialized filters to isolate excitation and emission wavelengths for NADH and FAD, and a precision shutter to control light exposure.

The user-friendly interface of Em-Lux includes a touch-enabled Panel PC, simplifying device operation and enabling efficient control of imaging parameters.

The device includes a robust electronics system that manages power distribution and control functions, ensuring the stable operation of all components.

Em-Lux features a temperature-controlled chamber with an enclosed design utilizing a system of water lines to provide localized heating, Em-Lux is outfitted with a cuvette-style chamber designed for the precise containment of chemical compounds such as coumarin, serving as a reference source. The chamber is sealed at a predetermined concentration, ensuring it remains shielded from ambient light exposure.

The software platform of the Present Invention is an enterprise software that provides the following services: Tracks parental information that's embedded in the QR code on the consumable device shown in FIGS. 2A-2B; Provides means of visualizing intensity images along with their fluorescence lifetime; Has a ranking system which ranks embryos based on their viability score; Has a recommendation system where it provides complimentary and suggestive information to embryologists for embryo implantation; Tags embryos with their genders (M/F); and Saves and stores all images and data on a secure cloud-based infrastructure for traceability, etc.

Em-Lux's proprietary device is preferably developed as a glass-bottom, multi-well device that allows for simple identification and tracking of embryos. It has single, 2, 4, 8 or 12 wells designs, with correct refractive indexes for glass bottom type of imaging. The device is automatically positioning against the scope for optimum imaging.

The device preferably has a QR code that upon initial scanning will start the imaging process. The device will have all patient information as well as tagging means to identify individual embryos or eggs for better traceability.

The QR code is preferably etched on the consumable petri-dish for imaging device activation.

The device material is preferably a glass button with a refractive index of 1.3 to 1.7, depending on the application.

Z-Plane Imaging for Embryo Analysis: Three Z-planes captured for comprehensive embryo assessment. Planes analyzed separately, focusing on inner cell mass and trophectoderm.

Data Processing and Encryption: Images locally stored, patient data encrypted, and anonymized. Data sent to cloud servers for further processing.

Morphological Data Analysis: Quality filtering and removal of blurred images. Expert grading, CNN models (ResNet, EfficientNet, Inception) for embryo scoring. Scores combined for inner cell mass and trophectoderm.

Metabolic Endpoints Analysis: Photon lifetime data used for a 2D heatmap. S and G photon components plotted on an S-G phasor plot. Gaussian Mixture Models identify ICM, TE, and ZP regions. 2D/3D plots generated, featuring various extracted variables.

Figure 9:
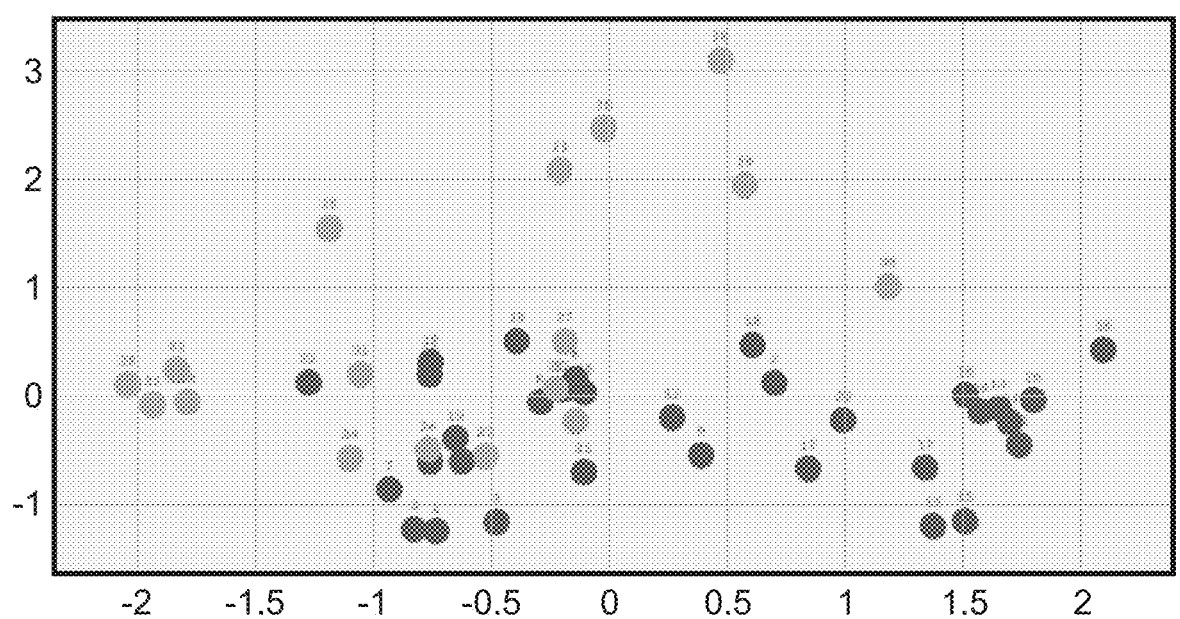
FIG. 9 is a Principal Component Analysis plot
Figure 10:
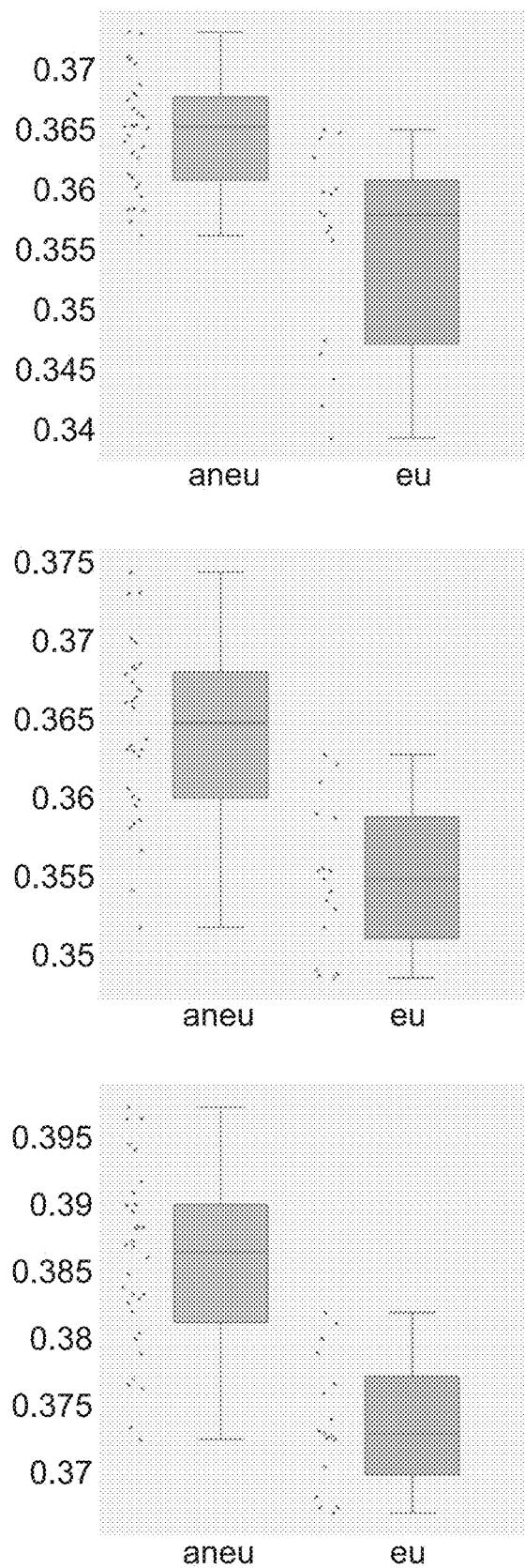
FIG. 10 is a set of Q-Q plots.

Data Classification and Analysis: Component analysis assesses variable relevance for aneuploid and euploid identification, as shown in FIGS. 9-10. Principal Component Analysis (PCA) enhances variance and population separation. Harmonic analysis applied to 1st, 2nd, and 3rd harmonics for data refinement.

In FLIM data analysis, the present invention incorporates a new and highly sophisticated statistical analysis and not assessing Bound vs. Free NADH. Sophisticated feature extraction and principal component analysis techniques for characterizing data distributions, including means, centroids, covariances, angles, tau phase, radius, max intensity, and full width at half maximum, to identify aneuploids and euploids. Innovative use of Principal Component Analysis (PCA) and higher harmonic analysis (1st, 2nd, and 3rd) to maximize variance and refine data classification for enhanced population separation in phasor plot density contour analysis. In calculating the Embryo Morpho-Metabolic Index (EMMI), the present invention integrates morphological endpoints such as shape and size around ICM and TE with their prospective lifetime signal. It also integrates patient demographic data and medical history in our AI-based EMMI analysis. With this method we have the granularity to identify viability by isolating the FLIM signal on different components of Embryo such as ICM and or TE. The device is integrated or connected to commercially available microscopes. In terms of engineering and opto-mechanical components of Em-Lux, is an all-in-one set up with a fully enclosed optical components with a touch-based panel PC.

A heated chamber is designed for locally heating the sample and keeping the temperature at desired degrees. Enclosed reference imaging chamber.

Three Z-planes images of embryos are obtained to make sure the necessary components in the Embryo (inner cell mass, trophectoderm) are captured. The three Z-planes are captured and analyzed separately and only the plane that represents the desired biological components are passed down to the next steps of analysis.

Figure 2A:
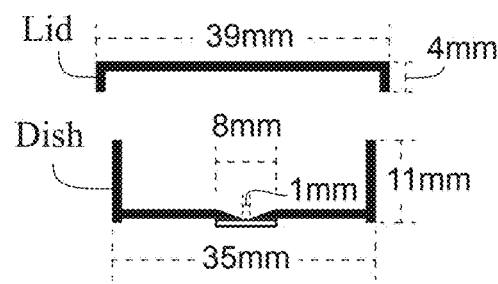
FIG. 2A is an illustration of a single position embryo unit.
Figure 2A:
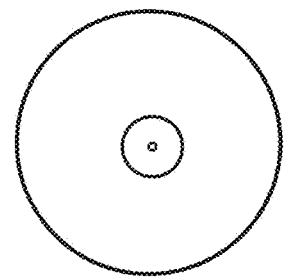

FIG. 2A shows a single-position embryo unit.

Figure 2B:
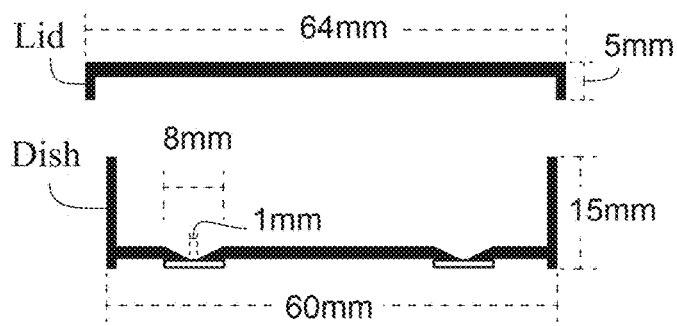
FIG. 2B is an illustration of a quad position embryo unit.
Figure 2B:
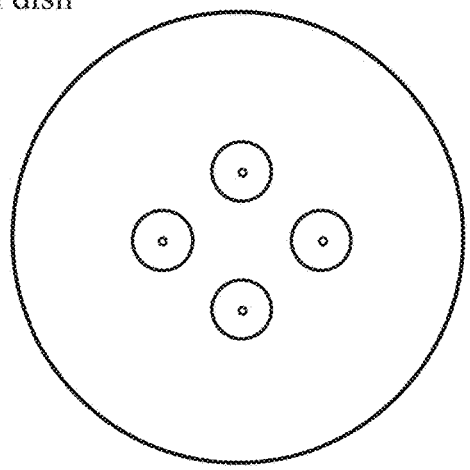

FIG. 2B shows a quad-position embryo unit.

Figure 3:
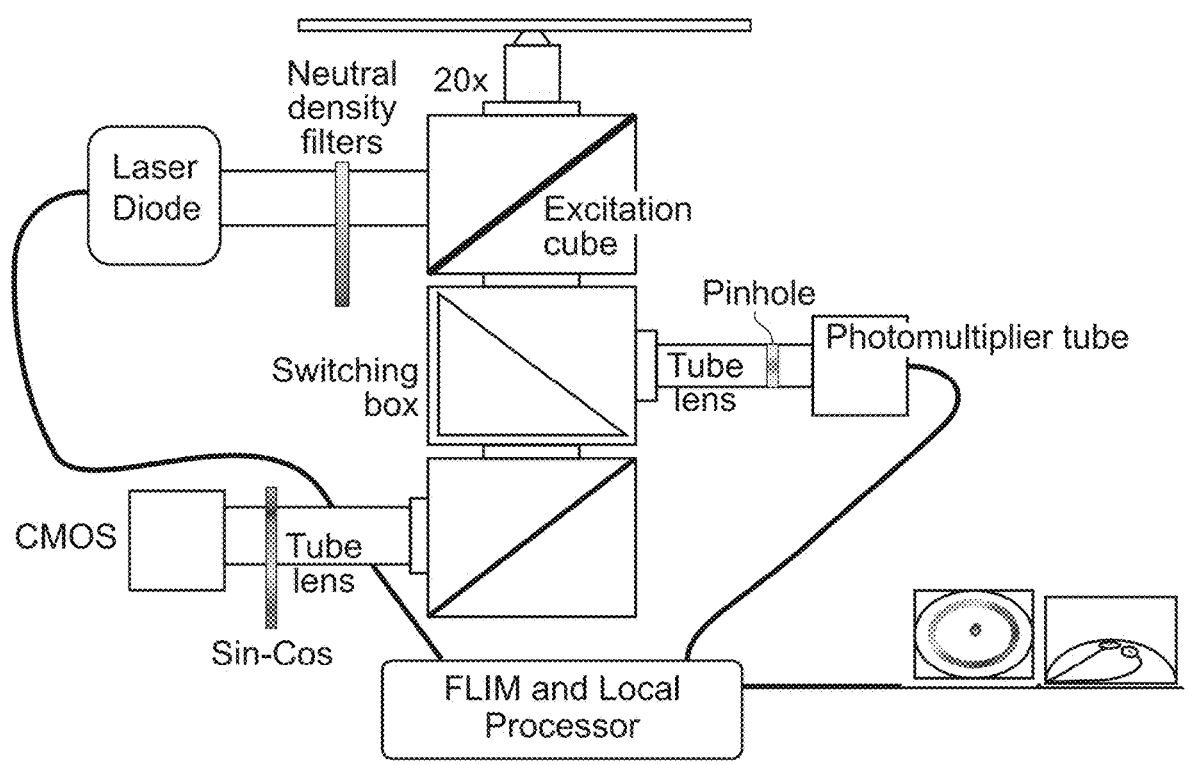
FIG. 3 is an illustration of an optical set-up of a FLIM Phasor.

FIG. 3 is an illustration of an optical set-up of a FLIM Phasor. The optical elements are cube and metal connections, including a pipe for shielding laser light, dichroic, blocking filter, excitation cube (dichroic mirror with long pass filter). Shutters, computer-controlled, are for the laser, PMT and optional for CCD/CMOS. The PMT is preferably Model FPD-700 by ISS (H10720P-04). PMT Controller (Gain and T controller, USB). The FAST FLIM card is preferably a USB3, Spartan6. The motor controller is preferably for controlling 3 stepper motors, USB. A first Option for the laser is a Model CFL-04RFF by Calmar, 780 nm, 50 MHz rep rate. A second option for the laser is a Laser Diode such as Cube Diode Laser system from Coherent. The processing unit is preferably a CPU with 16 GB RAM, Linux or Windows based. The Software module is preferably an Em-Lux EVS. CMOS or CCD Camera is preferably 8 Megapixel CCD Scientific Camera for Microscopy Polarization Camera with 5.0 MP Monochrome CMOS Sensor.

A novel phasor approach is utilized in the present invention and uses feature extraction through principal components analysis at higher harmonics to increase the sensitivity to fluorophore proximity that can report on changes in nucleosome. Additionally, this method of FLIM analysis provides for fit-free quantification of spectroscopic properties recorded in each pixel of an image, The spectral phasor transformation calculates the sine and cosine Fourier components of the spectrum profile. For each of the calculated Fourier components, 2 coordinates are obtained, indicated by "g" and "s". A polar plot is constructed to map all data points with coordinates (g,s). These data points are called Phasor. L in the equation is the total wavelength (2) range of the detector. Phase is proportional to the spectrum average wavelength. Spectral phasor analysis provides a simple graphical method to distinguish the free/bound emission spectra of NADH autofluorescence signals.

$$g = \frac{\sum_\lambda I(\lambda)\cos(2\pi_n\lambda/L)}{\sum_\lambda I(\lambda)}$$

$$s = \frac{\sum_\lambda I(\lambda)\sin(2\pi_n\lambda/L)}{\sum_\lambda I(\lambda)}$$

Emission Spectra for NADH2: 1) Free NADH 2) Enzyme-NADH 3) Enzyme-NADH-L-glutamate 4) Enzyme-NADH-L-3-hydroxygluterate (Bell JE Chapter 4 Fluorescence Solution Studies in Spectroscopy in Biochemistry vol I JE Bell ed CRC Press Inc Boca Raton FL pp 155 194 1981 Bell JE Chapter 4 Fluorescence Solution Studies in Spectroscopy in Biochemistry vol I JE Bell ed CRC Press Inc Boca Raton FL pp 155 194 1981).

The present invention preferably utilizes an AI model that identifies which factor or combination of endpoints contribute the most to identifying and characterizing Embryo Viability. The outcome is assessed by success rate of embryo becoming a successful pregnancy that will need to be measured in 4-6 weeks post implantation. The model is comprised of many methodologies, such as clustering and deep learning model, in order to increase the efficacy of an IVF procedure.

The present invention is preferably a predictive model that first classifies viable vs. non-viable embryos and then ranks the viable ones based on their EMMI. The goal of this assessment is to provide physicians with a recommendation system to suggest which embryo(s) to be implanted during an IVF procedure for the highest chance of success.

The present invention has developed a comprehensive AI network designed to acquire data from IVF facilities, conduct initial on-device preprocessing, and subsequently transmit the data to cloud-based AI training models for enhanced efficiency. This pioneering algorithmic framework, known as EMMI (Embryo Morpho-Metabolic Index), integrates morphological and metabolic endpoints to evaluate embryos, aiding IVF facilities in selecting embryos with the highest probability of successful implantation.

EMMI derives its calculation from three primary data pipelines: Patient demographics; Metabolic Endpoints from FLIM; and Morphological Measures.

Patient demographics encompasses a wide array of patient-specific information, including age medical history, current medications, and data from wearable devices. These details are leveraged to generate valuable numerical data.

Metabolic endpoints from FLIM focuses on capturing metabolic information by analyzing FLIM signatures of NADH, FAD, and lipids. This sophisticated analysis provides critical metabolic data.

In Morphological Measures the embryo's morphology is evaluated based on features such as shape and size, extracted from high-contrast (brightfield) images. This component is crucial in assessing the structural characteristics of embryos.

Figure 4A:
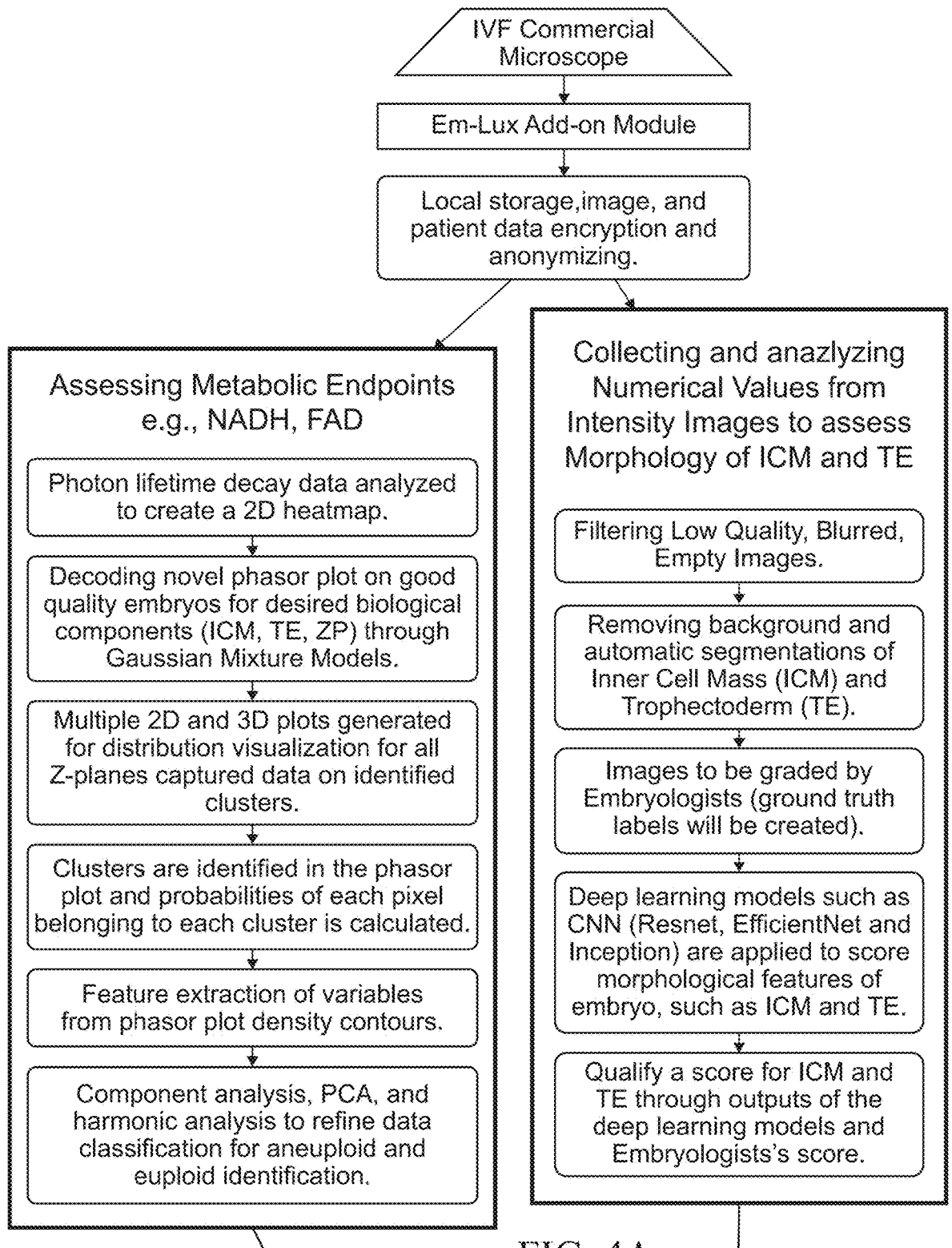
FIG. 4A is a flow chart of a process for calculating Embryo Morpho-Metabolic Index.
Figure 4B:
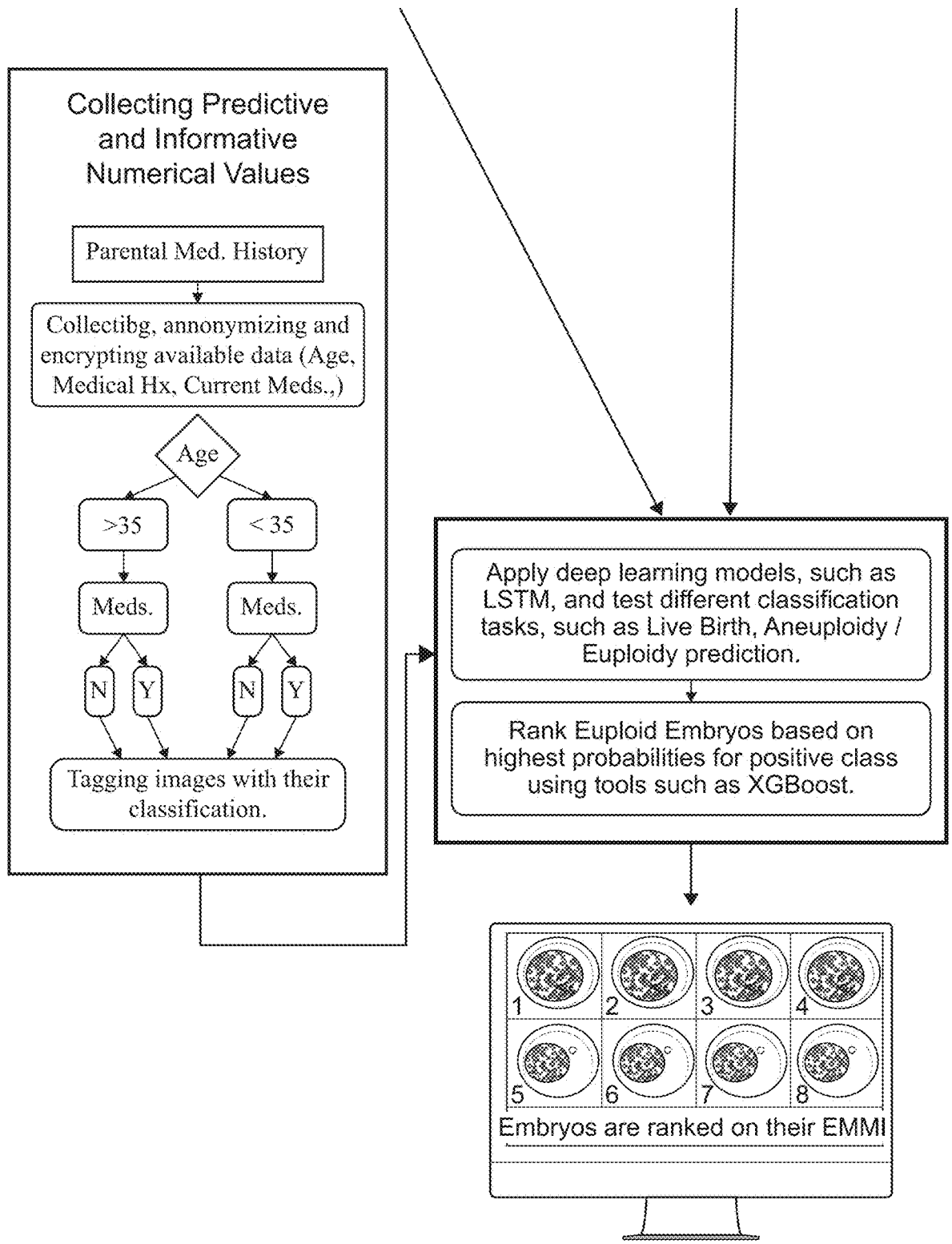
FIG. 4B is a flow chart of a process for calculating Embryo Morpho-Metabolic Index.

The process for deriving the EMMI score is shown in FIGS. 4A-4B.

Embryos that are placed on bar-coded-enabled petri-dishes are first scanned to bring in all patient data.

Petri-dishes are placed either on a stand-alone Em-Lux or on an IVF microscope that is equipped with Em-Lux as an add-on module.

Prior to image acquisition, a reference image is obtained by imaging a known concentration of chemical compounds, such as coumarin.

Figure 5:
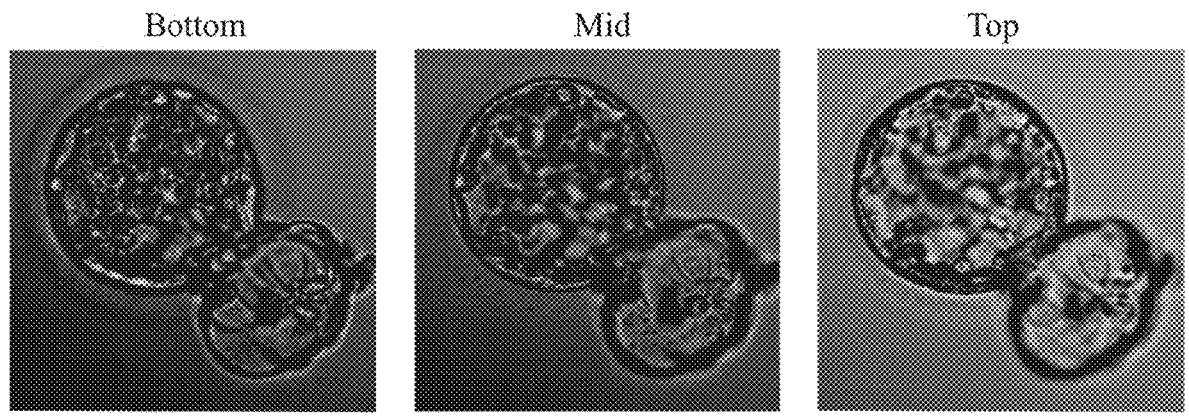
FIG. 5 is a set of Z-plane brightfield images of embryos.
Figure 6:
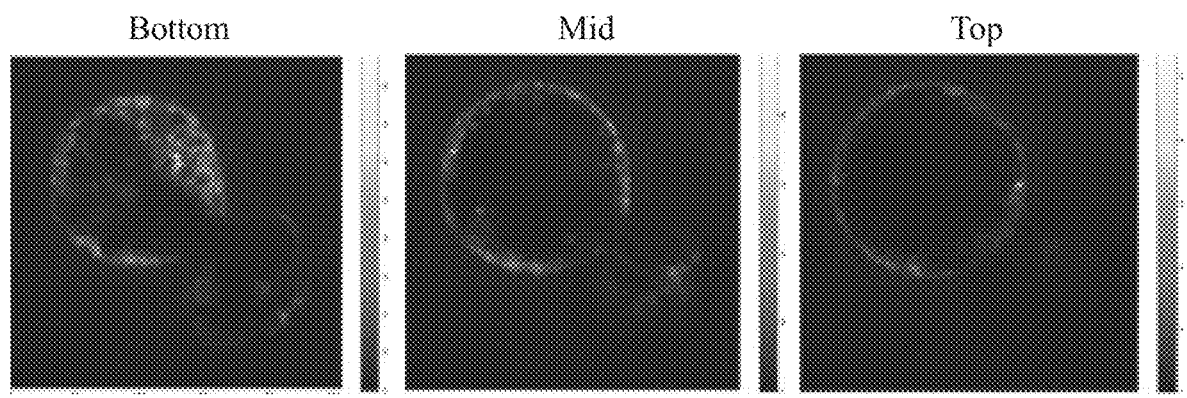
FIG. 6 is a set of photon density FLIM images.

Images are acquired through Em-Lux, serving as either a stand-alone or as an add-on module. These images include both FLIM data and brightfield images, as shown in FIGS. 5 and 6.

Figure 7A:
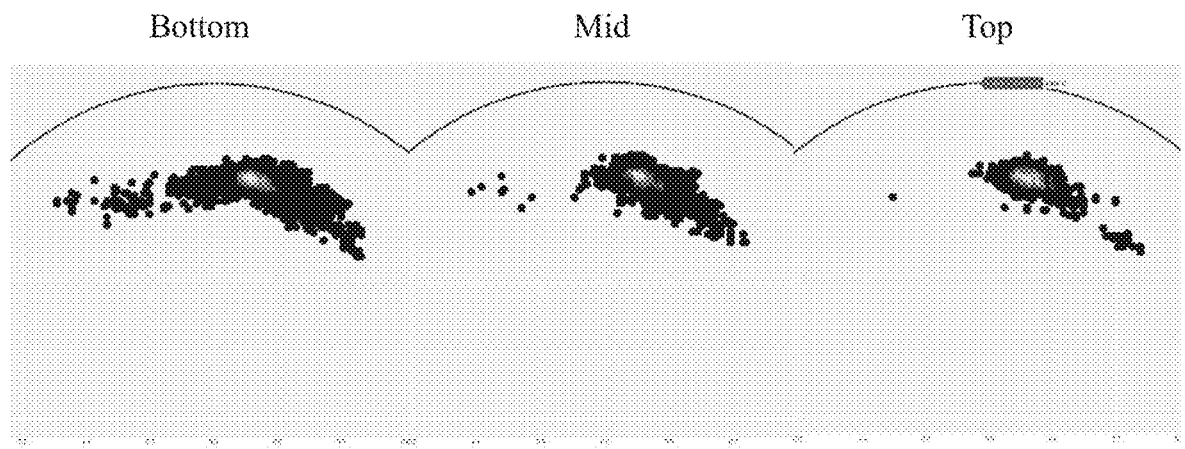
FIG. 7A is a density photon phasor plot.
Figure 7B:
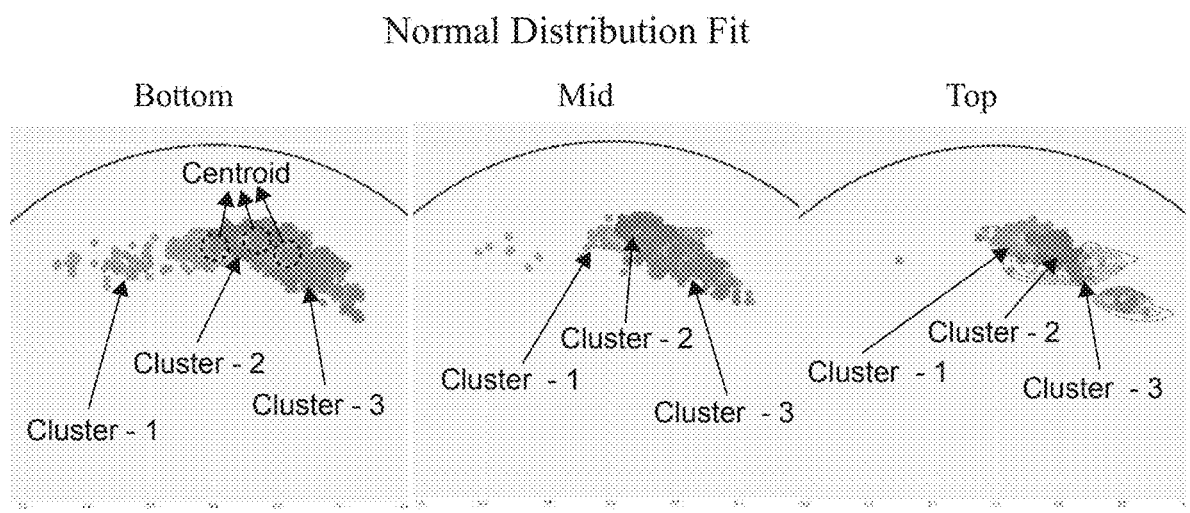
FIG. 7B is a normal distribution fit plot.
Figure 8:
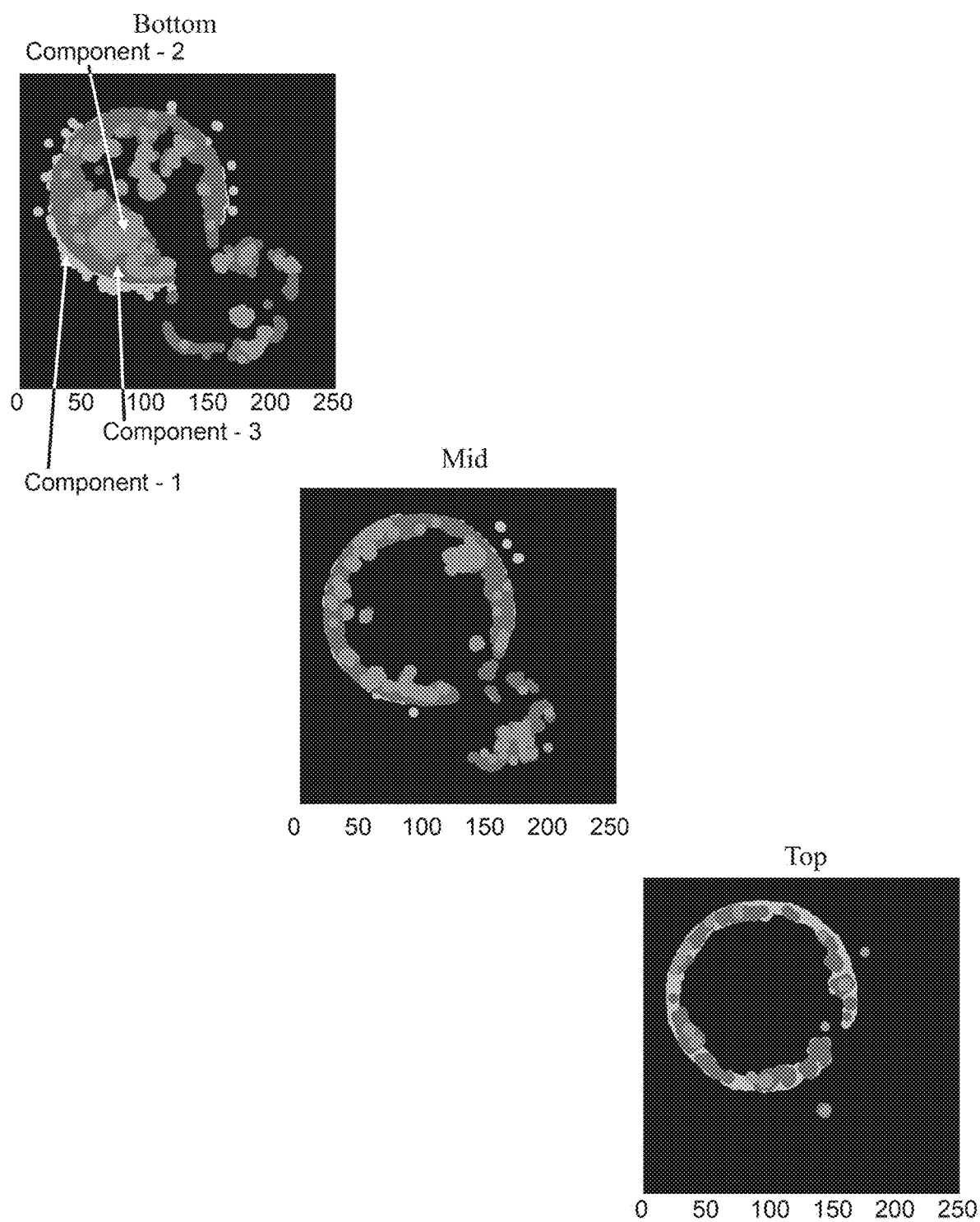
FIG. 8 is a set of images showing density according to normal distribution.

Phasor plot density contours of real and randomly generated data are compared, as shown in FIGS. 7A-7B, and FIG. 8.

Feature extraction is performed on the distributions yielding variables such as means, centroids, covariances, angles, tau phase, radius, max, intensity, and full width at half maximum.

Once the embryos are categorized into two groups based on this data they are ready for integration with numerical data from other pipelines (morphology and demographics).

Classification and Probability Assignment

In this phase, deep learning models, including Long-Short-Term Memory (LSTM) are applied to classify embryos and assign probabilities. Various classification tasks, such as implantation rate, live birth, and differentiation between Aneuploidy and Euploidy, are explored. Embryos are ranked based on their highest probability for the positive class using techniques like XGBoost.

User Interface

The results, including brightfield images, or embryo IDs along with their respective ranking are presented on a user-friendly GUI for embryologists to facilitate the selection of embryos for implantation. This simplifies the decision-making process, aiding in the identification of the most viable embryos for successful IVF procedures.

In order to calculate the Viability Score data is collected from three distinct sources: (1) Metabolical and Functional endpoints from FLIM including FAD, NADH, Lipids, etc.; (2) Morphological endpoints from intensity images captured by the device including shape and size; and (3) Parental health data including Current and previous diseases, Current and previous medications, Nutrition and diet, and Data from wearable devices such as average Sleep time and duration, average Heart Rate, # of daily steps taken, SpO2, etc.

The final product will be a cloud-based platform that will incorporate all the datapoints mentioned above and provides a real-time recommendation to physicians as to which Embryo(s) to be implanted for an IVF procedure. This platform will be an end-to-end network that feeds directly from Em-Lux, sends data to the cloud-based processing algorithms and displays the results in a simple graphical user interface on client side.

These sets of data will undergo "data cleaning" before processing and feature engineering.

Overall algorithm to calculate Embryo Viability Score based on FLIM, Morphological Endpoints and Parental Demographic Information Once the data is obtained through the Em-Lux device (as a module connected to available microscopes or as a stand-alone device) the data will be separated into FLIM and Intensity images. Both datasets will undergo edge-encryption and anonymization before getting transferred to the secure cloud storage (AWS S3) for further processing:

Intensity Images: These images will be initially graded by embryologists for their quality; Uninformative images and images with heavy artifacts will be removed from the dataset; Tagged images will undergo further processing and training on Amazon Sagemaker platform to further differentiate good vs. poor quality images; and Machine learning algorithms (supervised learning and DNN) will be used to further segmentize Embryo images. Images with Good and Fair embryos are now separated into their dedicated cohorts and are ready for their time-domain data to be assessed through FLIM signal.

Time-Domain Data (FLIMmages): Lifetime files are decoded from FLIM images on the segmented images; Individual photons at each pixel level will be assessed in order to create a spectral phasor plot; Through clustering algorithms, clusters of photons are separated and identified on the phasor plot with the probability of each pixel to belong to each cluster being calculated; Clusters are delineated with a line based on the probability values from the previous step; At this stage, the concentration of NADH, FAD, Tryptophan and other chemicals will be identified; Using classification algorithms such as XGBoost or LightGMB the viable vs. non-viable embryos based on their functional readouts will be separated out; the concentrations of Tryptophan, Leucine and Asparagine are used to determine the gender in a separate clustering processing; Viable Embryos are then ready to be ranked through Pariwise or Listwise ranking algorithms; Once viable embryos are ranked, they'll be displayed on a web-based software GUI along with their gender tags; At this step, embryologists are able to identify the most viable embryo in a desired gender for implantation.

Parental Medical and Demographic Information: The Present Invention optionally collects and assesses demographic and medical information from mothers. This will serve as on-going training and will optimize the algorithms used in the present invention. Demographic data such as age, current medication, etc., are collected and fed into the DNN algorithm.

The Present Invention is preferably a device that is integrated or connected to commercially available microscopes.

Widefield multi-frequency fluorescence lifetime imaging of embryos was collected using a two-tap CMOS camera with lateral electric field charge modulator through microscope optics. To improve the resolution and construct precise 3D imagery as needed, the Present invention introduces other detection systems and excitation methods for high sensitivity and speed, enabling live-cell imaging alongside deep tissue observation. The detection and excitation systems could be used including: Detection systems, FLIM camera: CMOS based, e.g. JCAM, PCO FLIM; EMCCD based, lambert toggle etc.; PMT/Hybrid detector: any types, Hyperspectral method: sin-cos filters with camera, hyperspectral imager. In addition to the current FLIM design, we can upgrade the Field-programmable gate array (FPGA) algorithm to perform various options, including phase control, sweeping, and process FLIM data directly as an embryo matrix. Such a configuration greatly reduces the complexity required in daily operation. Excitation methods: Diode Laser. In this set up we can use a diode laser to excite the embryos. Wavelengths will be in Green and Red range with power at 5-20 mw; Pulsed laser: one photon: 375, 405 for UV or 473/488 for green channel, two photon (780 fixed or 690-1040 variable), confocal scanning/TPEF scanning, point scan/line scan (volumetric), DIVER, SPIM/lightsheet.

The Present Invention provides an addition of structural and morphological endpoints to the assessment in an AI-based algorithm.

The Present Invention provides an addition of connectivity to the device to transfer the data to a cloud-based AI infrastructure for processing.

The Present Invention provides an addition of parental demographic, nutritional, medical data to assessing the viability of Embryos.

The Present Invention provides a novel classification and ranking method to rank embryos based on their viability score.

The Present Invention provides an enterprise level software platform (on edge or on the cloud) embryologist-facing platform for visualizing the ranked Embryos and Eggs.

For classifying Viable vs. Non-viable embryos, the Present Invention preferably does not use the distance histogram program. The Present Invention uses classification algorithms such as XGBoost or LightGMB for better differentiation and more robust analysis.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for determining the viability of an embryo using an embryo morpho-metabolic index and Em-Lux device, the method comprising:

receiving, at a processor, a plurality of morphological endpoints from a plurality of intensity images of a plurality of embryos obtained from an imaging module device, wherein the plurality of intensity images comprises at least three Z-plane images that disclose an inner cell mass and trophectorderm of the embryo;

receiving, at the processor, a plurality of metabolical and functional endpoints from fluorescence lifetime imaging microscopy (FLIM) data for the plurality of embryos based on a phasor-based FLIM analysis to capture vibrations in the plurality of embryos, wherein the plurality of metabolical and functional endpoints comprises FAD, NADH, or lipids;

receiving, at the processor, parental health data for a parent of the plurality of embryos;

classifying each of the plurality of embryos as viable and non-viable;

calculating, at the processor, an embryo viability score for the plurality of viable embryos based on the parental health data, plurality of metabolical and functional endpoints from FLIM data and the plurality of morphological endpoints, wherein calculating the embryo viability score for the plurality of embryos comprises analyzing the three Z-plane images of the plurality of images to determine an image that discloses a plurality of biological components of the embryo, performing morphological data analysis to remove low-quality images, performing removal and segmentation of inner cell mass (ICM), trophectoderm (TE), and zona pellucida (ZP), grading the plurality of images to establish a ground truth, using Convolutional Neural Network (CNN) models to score morphological features of embryos, and combining scores for ICM and TE using model outputs and assessments;

performing metabolic endpoints analysis to create a two-dimensional heatmap using photon lifetime decay data, plotting S and G components of photon lifetimes on an S-G phasor plot, fitting Gaussian Mixture Models to identify ICM, TE, and ZP regions, generating two-dimensional and three-dimensional plots for distribution visualization, and extracting a plurality of variables comprising at least one of means, centroids, covariances, angles, tau phase, radius, max intensity, and full width at half maximum; and conducting component analysis to assess variable relevance in identifying aneuploids and euploids;

performing Principal Component Analysis (PCA) to maximize variance and enhance population separation; and performing harmonic analysis on 1st, 2nd, and 3rd harmonics for further data refinement; and displaying the embryo viability score at a user interface.

2. The method according to claim 1 wherein the parental health data comprises at least one of current diseases, previous diseases, current medications, previous medications, nutrition, diet, average sleep time, average heart rate, SpO2, or the number of daily steps taken.

3. The method according to claim 1 wherein the imaging module device is a single-position embryo unit or a quad-position embryo unit.

4. The method according to claim 1 further comprising utilizing detection system comprising a FLIM imaging module or stand-alone set-up.

5. The method according to claim 1 further comprising utilizing a FPGA algorithm to perform phase control, sweeping and processing of FLIM data directly as an embryo matrix.

6. The method according to claim 1 further comprising utilizing feature extraction methods in phasor analysis or utilizing an excitation method comprising using at least one of a diode laser or a pulsed laser.

7. A system for determining the viability of an embryo using an embryo morpho-metabolic index and Em-Lux device, the system comprising:
a device connected to a microscope and controls the light source and detection mechanism for the microscope;
a processor; and
a user interface display;
wherein the processor is configured to receive a plurality of morphological endpoints from a plurality of intensity images of a plurality of embryos obtained from the device;
wherein the processor is configured to receive a plurality of metabolical and functional endpoints from FLIM data for the plurality of embryos based on a FLIM analysis to capture vibrations in the plurality of embryos;
wherein the processor is configured to received parental health data for a parent of the plurality of embryos;
wherein the processor is configured to process photon lifetime decay data to create a 2D heatmap and generate an S-G phasor plot;
wherein the processor is configured to utilize Gaussian Mixture Models to identify ICM, TE, and ZP regions;
wherein the processor is configured to generate two-dimensional and three-dimensional plots for distribution visualization;
wherein the processor is configured extract a plurality of variables comprising at least one of means, centroids, covariances, angles, tau phase, radius, max intensity, and full width at half maximum;
wherein the processor is configured through component analysis to assess variable relevance in distinguishing between aneuploids and euploids;
wherein the processor is configured to utilize Principal Component Analysis (PCA) to maximize variance and improve population separation;
wherein the processor is configured apply harmonic analysis to the 1st, 2nd, and 3rd harmonics for additional data refinement; and
wherein the user interface display is configured to display the embryo viability score at a user interface.

8. The system according to claim 7 wherein the processor is configured to classify each of the plurality of embryos as viable and non-viable and provide ranking based on their probability values.

9. The system according to claim 7 wherein the device is a single-position embryo unit or a quad-position embryo unit.

10. The system according to claim 7 wherein the processor resides at a cloud-based infrastructure.

11. The system according to claim 7 further comprising a detection system comprising a FLIM camera.

12. The system according to claim 7 further comprising a diode laser or a pulsed laser.

13. A method for determining the viability of an embryo using an embryo morpho-metabolic index and Em-Lux device, the method comprising:
receiving, at a processor, a reference image of a known concentration of coumarin;
receiving, at the processor, a plurality of intensity images of a plurality of embryos obtained from an imaging module device, wherein the plurality of images comprise FLIM data and brightfield images, wherein the plurality of images are at least three Z-plane images;
analyzing the plurality of images to determine an image that discloses a plurality of biological components of the embryo;
performing, at the processor, morphological data analysis on the plurality of images to remove low-quality images of the plurality of images, removal and segmentation of inner cell mass (ICM), trophectoderm (TE) regions and zona pellucida (ZP), grading the plurality of images, applying convolution neural network models to score the morphological features of the embryos, assigning scores separately for ICM and TE and combining the scores using a plurality of model outputs and assessments;
performing, at the processor, metabolic endpoints analysis on the plurality of images to create a two-dimensional heat map by analyzing photon lifetime decay data, plotting S and G components of photon lifetimes on an S-G phasor plot, fitting Gaussian mixture models to identify the ICM regions, TE regions and ZP regions, plotting two-dimensional and three-dimensional plots to visualize distributions, comparing phasor plot density contours of real and randomly generated data, extracting features on distributions to yield a plurality of variables comprising at least one of means, centroids, covariances, angles, tau phase, radius, max intensity, and full width at half maximum, conducting component analysis to assess the relevance of the plurality of variables in identifying aneuploids and euploids, employing Principal Component Analysis (PCA) to maximize variance and enhance population separation, and conducting harmonic analysis is conducted on 1st, 2nd, and 3rd harmonics to further refine data classification;
classifying embryos and assigning probabilities of viability; and
displaying the results on a graphical user interface classify embryos and assign probabilities.

14. The method according to claim 13 wherein the imaging module comprises a light source, a FLIM card, a detector, a CMOS camera, a microscope, a computer-controlled XYZ stage, a vertical post and incubator, a mechanical extending mechanism, a plurality of optical components, a panel PC, a temperature-controlled chamber and a cuvette-style chamber.

15. The method according to claim 14 wherein the light source is configured to excite NADH and FAD molecules in the embryos at either 740 nanometers (nm) or 780 nm wavelengths pulsed laser to provide accurate data collection and minimize damage to the embryos.

16. The method according to claim 14 wherein the detector is configured to capture emitted fluorescence signals.

17. The method according to claim 13 wherein classifying embryos comprises implantation rate, live birth probability, and differentiation between Aneuploidy and Euploidy.

18. The method according to claim 13 wherein the morphology of each of the embryos of the plurality of images is evaluated based on a shape and a size, extracted from the plurality of brightfield images of the plurality of images.

19. The method according to claim 13 wherein further comprising receiving a plurality of parent data comprising at least one of age, medical history, current medications, and physical data derived from a wearable device.

* * * * *